United States Patent Office 2,888,501
Patented May 26, 1959

2,888,501

PROCESS AND CATALYST FOR ISOMERIZING HYDROCARBONS

Hillis O. Folkins and Norman L. Carr, Crystal Lake, Ill., assignors to The Pure Oil Company, Chicago, Ill., a corporation of Ohio No Drawing. Application December 31, 1956
Serial No. 631,518

18 Claims. (Cl. 260—683.65)

This invention relates to a catalyst support having hydrocarbon cracking activity and acidic properties. It more specifically is directed to a silica-alumina composition for use in preparing nickel-containing isomerization catalysts.

A considerable onus is placed on petroleum refiners because of the increasing octane requirements of modern, high-speed, high-compression, internal combustion engines, and the competitive market to provide suitable gasoline motor fuels for use in these engines. In formulating a gasoline motor fuel, a major portion of the composition consists of gasolines derived from the catalytic cracking of petroleum gas oil fractions. The remainder of the composition can be from light virgin distillates employed without further treating; however, it is desirable to upgrade these light distillate naphthas to produce higher octane blending stocks. To effect this end, a variety of refining processes such as reforming, isomerization, alkylation, or polymerization can be used with attendant advantages. Isomerization of suitable feed stocks produces high-octane-number, branched-chain paraffins which can be incorporated in gasoline blends to promote a more efficient utilization of tetraethyl lead. Isomerized paraffinic blending stocks are desirable because of their very low sensitivity.

As catalysts for use in isomerization processes employed in upgrading mixtures of saturated aliphatic and/or alicyclic light hydrocarbons, such as straight-run petroleum naphtha distillates, to provide high-octane-number gasoline blending agents, it has been found that composites of cracking catalysts and hydrogenation catalysts are highly active and selective (Vide Isomerization of Saturated Hydrocarbons in Presence of Hydrogenation-Cracking Catalysts, Ciapetta, et al., Ind. and Eng. Chem., 45 (1) 147, et seq.). Specific catalysts are prepared by incorporating a small amount of a hydrogenation agent in a refractory, mixed-oxides base composited to evince acidic properties and hydrocarbon cracking activity. Suitable hydrogenation agents include nickel and nickel salts.

While these catalysts are effective as isomerization catalysts, their efficiency can be improved by preconditioning the composite catalyst prior to use in isomerization service. This technique, in essence, comprises incorporating a minor amount of a hydrogenation component in a refractory, mixed-oxides base composited to evince acidic properties and hydrocarbon cracking activity substantially in accordance with conventional catalyst preparation techniques. The freshly prepared, "green" catalyst is activated in a reducing atmosphere in accordance with the prior art to effect reduction of the hydrogenation component of the catalyst as far as possible under specific conditions. Thereafter, the catalyst is subjected to the additional activation and conditioning treatment described in the following application. In carrying out this preconditioning phase of the catalyst preparation, the composite catalyst is subjected to an oxidizing atmosphere maintained at a temperature of about 650° F. to 750° F. Following this, the oxidized catalyst is contacted with hydrogen at the same temperature as that which the oxidation was carried out to reduce the reducible elements of the composition and produce a composite catalyst of high activity and resistance to degeneration. This preconditioning procedure is described and claimed in U.S. patent application entitled "Catalysts and Process," Serial Number 619,376, filed October 31, 1956, by Norman L. Carr.

It has been found that the activity and catalyst life characteristics of composite isomerization catalyst prepared by employing a silica-alumina composition as the support can be further improved. Accordingly, it is the object of this invention to provide composite isomerization catalysts comprising a silica-alumina support having incorporated therein a nickelous hydrogenation agent. It is another object of this invention to provide an improved silica-alumina support for use in the preparation of composite isomerization catalysts containing a minor amount of a nickelous hydrogenation agent. A further object of this invention is the preparation of a silica-alumina support containing substantially equal parts of silica and alumina for use in the manufacture of composite isomerization catalysts containing a minor amount of a hydrogenation agent incorporated in a silica-alumina support. It is also an object of this invention to employ the improved composite catalyst, comprising a highly active and selective silica-alumina support having incorporated therein a minor amount of a nickelous hydrogenation agent, to effect the isomerization of $C_5$–$C_8$ hydrocarbons and mixtures thereof.

These and other objects will become apparent from the following detailed description of this invention.

In the preparation of silica-alumina compositions for use in the preparation of composite isomerization catalysts, conventional cracking catalysts have been employed. In general, these catalysts are prepared by a variety of catalysts preparation techniques, including the treatment of aqueous solutions of their soluble salts, such as sodium silicate and aluminum sulfate, with precipitating agents such as mineral acids. The hydrogels thus obtained are transformed to gels by suitable thermal treatment, e.g., drying followed by calcination at about 1000–1200° F. Other techniques include mixing two, wet, pre-precipitated silica and alumina gels in the form of dilute slurries, or impregnating solid silica gel with a soluble aluminum salt which can be readily converted to the oxide upon heating, e.g., aluminum nitrate, and heating to an elevated temperature. Special methods of preparation of silica-alumina composites abound in the prior art and proportions of the two materials vary widely. Accordingly, a variety of these silica-alumina compositions which have been investigated can be used in the preparation of the composite isomerization catalysts hereinbefore described.

It has been shown in the prior art that a hydrogenation agent supported on a silica-alumina support containing about 60 percent alumina is much less active for isomerization than the support consisting of a silica-alumina composite containing about 13 percent alumina. It has been further found that selectivity and catalyst life increases as the alumina content is increased from 12 to around 25 percent in the support, and that as the alumina content of the support prepared in accordance with conventional catalyst preparations is increased beyond 25%, the activity for isomerization decreases and a tendency for hydrocracking exists. According to this invention, it has been found that composite isomerization catalyst having high activity, selectivity, and increased catalyst life can be prepared by incorporating a minor amount of a nickel-containing hydrogenation agent in a silica-alumina composition prepared in accordance with the formulation technique of this invention. Essentially, this technique consists of the preparation of two different silica-alumina combinations and subsequent intimate blending or mixing of the combinations to provide, before incorporating the nickelous hydrogenation agent to form the finished catalyst, a silica-alumina composite having a nominal alumina content of from about 25 wt. percent to about 60 wt. percent.

In formulating the silica-alumina combination of this invention, the first component is one in which the major component is alumina with about 1–10% of silica. This high-alumina component is prepared in a manner to obtain high surface area and small pores. A preferred method for the preparation of this support component consists of the neutralization of sodium aluminate, containing a small amount of sodium silicate, with a solution of sodium bicarbonate. In this way, for example, an alumina containing a small amount of silica, and having acidic properties and high surface area (ca. 200 m.$^2$/gm. or more) can be obtained when the precipitated product is calcined at temperatures to 1000° F. or above. Suitable catalysts of this type will have acidic properties requiring 0.7 to 1.6 milliequivalents of KOH to neutralize them. The second component is a high-surface-area, silica-alumina composition, containing not more than 25 percent alumina (generally in the range of 10–25 percent alumina), and falls in the class of most synthetic silica-alumina cracking catalysts. Preparation procedures are given in the literature and the resulting composition generally has a surface area in the range of 325–550 m.$^2$/gm. with an average pore diameter in the range of 40–100 A. These catalyst components are further characterized by being entirely amorphous. They have no dispersed alumina phase and show no X-ray pattern for alumina. The acid strength of this component is such as to require 1.7 to 2.4 milliequivalents of KOH to effect their neutralization.

Another important property common to the high-alumina component and the high-silica component is their ability to "take up" nickel from solution by selectively adsorbing the nickel ion.

Preferential adsorption of these acidic type supports (high alumina-low silica and high silica-low alumina) is shown by the following:

50 ml. of 2% Ni(NO$_3$)$_2$.6H$_2$O solution was contacted with the following powdered supports (20 gms.). Mixture was stirred 15 minutes and allowed to set one hour.

Excess solution was drained from each catalyst and analyzed for Ni ion content.

| Ni mgm./cc. | Support |
| --- | --- |
| 3.78 | Control solution. |
| 3.71 | Alcoa F–10 Alumina [1] (substantially SiO$_2$-free). |
| 1.95 | Alcoa H–41 Alumina [1] (5% SiO$_2$). |
| 0.74 | Davison Hi-Alumina Cracking Catalyst [2] (75–25 Silica Alumina). |

[1] Proprietary catalyst compositions available from the Aluminum Company of America.
[2] Oil and Gas Journal, October 17, 1955.

It is seen that no preferential adsorption occurs in alumina per se (Alcoa F–10). Preferential adsorption proportional to acidity occurs on the other two silica-containing alumina compositions.

To facilitate further discussion of this invention the silica-alumina components of the composite silica-alumina support, characterized as above, will be referred to respectively as the "high-alumina constituent" and the "high-silica constituent."

In the preparation of the composite catalysts of this invention, the two support components are calcined separately at temperatures of 1000° F. or above, and ground into fine powders, if not already in powder or microspheriodal form. The two support components are then intimately mixed in the proportions desired, for example, 65 percent of a 75–25 silica-alumina composition and 35% of a 5–95 silica-alumina composition to yield a finished support of about 50–50 silica-alumina. The finished isomerization catalyst is then prepared by incorporating 0.5 to 8% of the nickelous hydrogenation agent, based on nickel, in the silica-alumina combination employing conventional impregnation preparations. For example, in preparing a nickel-silica-alumina catalyst using the silica-alumina combination of this invention, this composite support is made into a slurry with an aqueous solution of a nickel salt, such as the nitrate. The nickel then is precipitated in the pores of the support by the addition of a precipitant, such as ammonium carbonate. The mixture is filtered, and the catalyst is dried at 230° F. Finally, it is activated under controlled conditions of temperature and hydrogen flow. The resulting catalyst is very effective for the isomerization of n-paraffins.

To illustrate the activity of this catalyst as compared with another of the same chemical composition, the following experiments were carried out.

EXAMPLE I

A nickel-silica-alumina catalyst containing 5 percent nickel incorporated into a nominal 50–50 silica-alumina composition was prepared as follows:

A sample of Alcoa H–41 alumina (5 percent silica) was ground to about a 200 mesh particle size and heated to 600° C. 136 grams of this material were added to 244 grams of Davison high-alumina (25%) regular density silica-alumina cracking catalyst. The two powdered materials were thoroughly blended in a laboratory blender.

The composite mixture was slurried into a solution of 99 grams of Ni(NO$_3$)$_2$.6H$_2$O in 900 ml. of distilled water. To this slurry was added, with stirring, a solution of 54 grams of ammonium carbonate in 500 cc. of distilled water. After 15 minutes of stirring, the excess solution was filtered off and the catalyst cake was dried at 230° F. for 16 hours. The resulting catalyst was pelleted into ⅛ inch pellets and activated by heating slowly to 975° F. in hydrogen flow, followed by further treatment with hydrogen at 975° F. for 16 hours.

Using a charge consisting essentially of an equal volume mixture of n-paraffins (n-pentane, n-hexane and n-heptane), to which 20 volume percent cyclohexane was added and having a Research Octane Number (clear) of 48, the catalyst described above was tested at 675° F., 350 p.s.i.g., 1.0 LVHSV and 3.5 H$_2$/hydrocarbon mol ratio. A product of 71 Research Octane Number was obtained with very little hydrocracking. Product liquid recovery was about 95%.

EXAMPLE II

Another catalyst of the same chemical composition, viz., 5 percent nickel on silica-alumina (50–50) was prepared by the following method:

To 800 ml. of water glass in 4000 ml. of distilled water was added 4000 ml. of 0.8 N sulfuric acid. The resulting silica gel was allowed to age 24 hours at room temperature. Foreign ions were removed by washing with distilled water containing one percent ammonium chloride, followed by washing with distilled water. Alumina gel was prepared by dissolving 1571 grams of AlCl$_3$.6H$_2$O in 6000 ml. of distilled water and precipitating by slowly adding 3000 ml. of 15 percent ammonium hydroxide solution. The resulting gel was filtered and washed until free of chloride ion.

The wet cakes of alumina and silica were slurried into 2000 ml. of distilled water and thoroughly blended. The resulting gel was filtered and the cake was dried at 230° F. for 24 hours after which it was calcined at 1150° F. 190 grams of the above silica-alumina catalyst were pulverized to around 200 mesh and slurried into a nickel nitrate solution, containing 49.5 grams of Ni(NO$_3$)$_2$.6H$_2$O in 450 ml. of water. To this slurry was added, with stirring, a solution of 27 grams of ammonium carbonate in 250 ml. of water. After 15 minutes of stirring the excess solution was dried at 230° F. for 16 hours. The resulting catalyst was pelleted into ⅛ inch pellets and activated by heating slowly to 975° F. in hydrogen flow, followed by further treatment with hydrogen at 975° F. for 16 hours. This catalyst was tested using substantially the same test conditions and charge stock employed in Example I and a product having a Research Octane Number of only 56 was obtained. Comparative results are shown in Table I.

Table I

[Feed stock: Equi-volume mixture of n-pentane, n-hexane, and n-heptane containing 20 vol. percent cyclohexane]

| Catalyst | Example I | Example II |
| --- | --- | --- |
| Liquid Volume Hourly space velocity | 1 | 0.8 |
| Pressure, p.s.i.g. | 350 | 350 |
| H₂/Hydrocarbon mol ratio | 3.5 | 3.5 |
| Average Reactor Temperature, °F. | 670 | ¹ 636 |
| Liquid Recovery, vol. percent | 94 | 97 |
| Product Research Octane Number, Clear | 71 | 57.4 |

¹ Catalyst could not be operated in test reactor above 640° F. due to excessive hydrocracking activity.

To further demonstrate the advantages obtained by the use of this invention, catalysts containing 5% nickel incorporated in an alumina composition containing 5% silica and 5% nickel incorporated in a 75-25 silica-alumina composition were tested as isomerization catalysts employing the hereinbefore-described reaction conditions and feed stock. The results of these experiments are tabulated in Table II, wherein by comparative data are shown the advantages obtained by employing the support-compositing technique involved in this invention. The life test work was carried out with a virgin light naphtha feed.

Table II

| Catalyst | Activity Rating | Arbitrary Useful Life, hr. | Comments |
| --- | --- | --- | --- |
| 5% Ni-(50-50) Silica-Alumina.¹ | 70 | 100 | |
| 5% Ni-(50-50) Silica-Alumina.² | 55 | None | High Hydrocracking tendency. |
| 5% Ni-(5% SiO₂) Silica-Alumina.³ | 51 | None | |
| 5% Ni-(75-25) Silica-Alumina.⁴ | 70 | 50 | |

¹ Prepared in accordance with Example I, supra.
² Prepared in accordance with Example II, supra.
³ Alcoa H-41 alumina, supra.
⁴ Davison Hi-alumina cracking catalyst, supra.

Although the foregoing illustrative examples are directed to the preparation of a nominal 50-50 silica-alumina support composition, the instant invention can be employed to increase the effectiveness of silica-alumina support compositions containing from about 25 to 60 percent alumina. Catalysts consisting of 10 percent nickel molybdate on silica-alumina supports of varying nominal alumina content were prepared as follows: Three supports made by intimately mixing Davison high-alumina (25%) silica-alumina fluid cracking catalysts and powdered H-41 Alcoa alumina (5 percent SiO₂). The composition of these mixed supports were as follows:

Table III

| Cat. No. | Percent silica-alumina (25%) | Percent alumina-silica (5%) | SiO₂—Al₂O₃ Total Composition |
| --- | --- | --- | --- |
| 1 | 65 | 35 | 50-50 |
| 2 | 85 | 15 | 65-35 |
| 3 | 50 | 50 | 40-60 |

Each of the above supports was used in the preparation of a nickel molybdate (10 weight percent) on silica-alumina catalyst.

The preparational procedure was as follows: nickel molybdate was precipitated from aqueous solutions of nickel nitrate and ammonium hepta molybdate, to which had been added excess ammonia, in the presence of the above appropriate support. The mass was digested at 180° F. for one hour and the excess solution filtered off. The cake, after washing, was dried at 230° F. for 16 hours and pelleted. The catalyst was activated by heating slowly to 975° F. in a flow of hydrogen and reduced at 975° F. for 16 hours.

Each of the above catalysts was tested in the isomerization of n-pentane under the following conditions: temperature, 700° F.; pressure, 350 p.s.i.g.; LVHSV=4.5 and hydrogen to hydrocarbon mol ratio of 0.5.

Under the above conditions the following results were obtained:

Table IV

| Catalyst Composition | | Temp., °F. | Percent | | |
| --- | --- | --- | --- | --- | --- |
| Metal | Support SiO₂—Al₂O₃ (nominal) | | Conversion | Yield (mol) | Selectivity |
| 10% NiMoO₄ | 65-35 ¹ (2) | 699 | 45.7 | 37.7 | 82.6 |
| 10% NiMoO₄ | 50-50 ¹ (1) | 699 | 41.7 | 36.0 | 86.3 |
| 10% NiMoO₄ | 40-60 ¹ (3) | 704 | 38.5 | 32.2 | 83.6 |

¹ Reference Table III.
NOTE.—Amount of NiMoO₄ based on total composition, respective portions of SiO₂ and Al₂O₃ based on support composition.

A catalyst (242-177) consisting of 10% NiMoO₄ on a nominal 50-50 silica-alumina support was prepared and tested in the same manner as above. In this case the mixed support was prepared by intimately mixing a Davison high-alumina (25%) silica-alumina fluid cracking catalyst with a calcined activated alumina (containing no silica) having a surface area of around 100 m.²/gm. The results obtained are tabulated below:

Table V

| Catalyst Composition | | Temp., °F. | Percent | | |
| --- | --- | --- | --- | --- | --- |
| Metal | Support SiO₂—Al₂O₃ (nominal) | | Conversion | Yield (mol) | Selectivity |
| 10% NiMoO₄ | 50-50 | 719 | 31.5 | 24.8 | 78.7 |

Activity and selectivity are lower than obtained in the catalysts in which alumina (containing 5 percent silica) was used as the corresponding support component.

The high-alumina constituent is preferably prepared as described in the illustrative example. Other catalyst preparations, however, can be used. The preparation of the "high-alumina constitutent" of the catalyst support by co-precipitation of the oxides or hydrous oxides of aluminum and silicon is preferred. This can be accomplished by treating solutions, containing the required amounts of water-soluble salts of aluminum such as the nitrate, chloride, sulfate, alkali metal aluminates, etc., and silicon salt solutions, such as the alkali metal silicates, with ammonia, alkali metal hydroxides or carbonates, etc., to precipitate a mixture of aluminum and silicon oxides. For instance, an aluminum salt, such as the nitrate, may be treated with the appropriate amount of sodium silicate whereby the silica and part of the alumina will be precipitated. The bulk of the alumina is then precipitated by the addition of ammonia or alkali metal hydroxides, etc. Similarly a mixture of alkali metal aluminates and alkali metal silica, in proper proportion, may be co-precipitated by the addition of a solution of alkali metal carbonate or by carbon dioxide. Other methods include the precipitation of high area alumina from aluminum salt solutions, the gel washed free of undesired ions, and the incorporation of the silica by adding sodium silicate solution. The mixture is then acidified, dried and washed. Similarly, the silica may be added to the hydrous alumina gel by adding a decomposable silicate, such as ethyl orthosilicate or by hydrolyzing a silicon salt such as silicon tetrachloride in a slurry of hydrous alumina. The preparation also encompasses the addition of a silicon salt to a pre-activated alumina. Thus, a dilute solution of sodium silicate may be used to impregnate a high surface area activated alumina, followed by acidifying to fix the silica, drying, ion exchanging and washing.

The high alumina-low silica composition, thus produced, is dried at around 230° F. and calcined at 900–1200° F. before blending with the high silica-low alumina component of the catalyst support.

The finished high-alumina constituent prepared in this manner will contain a 1–10% silica. This component will constitute around 10 to around 60% of the finished silica-alumina combination depending upon the composition desired.

The "high-silica constituent" employed is preferably selected from the variety of conventional silica-alumina cracking catalysts which contain 10–25% by weight of alumina. These cracking catalysts are also prepared using a variety of procedures. (Vide Advances in Catalysis, IV, p. 4 et seq., Reinhold, U.S. Patent 2,701,793, I. and E. Chem. 44, 2857, 1952, etc.) In blending the finished silica-alumina support, 90 to 40% of this constituent will be used.

In compounding the "high-alumina" and "high-silica constituents," each component is calcined, if this step was not previously used in its preparation, at a temperature of about 1000°–1200° F to insure dehydration, thermal structure and stabilization. This can be carried out in a conventional muffle furnace in an oxidizing or inert atmosphere, employing a time of about 8 to 24 hours, or spray dried and calcined as in the conventional preparation of microspherical cracking catalyst. If the components are not available in a pulverulent form the granular particles are comminuted to provide a particle size of about 40 to 150 microns. Comminuting apparatus such as ball, hammer, ring-roller, jet mills, and the like are used to effect this size reduction. Blending of the components to obtain intimate mixing can be accomplished using conventional circulating systems which represent a mechanical quartering method, e.g., mix mulling, ribbon mixers. For other systems which can be used reference is made to Chemical Engineers Handbook, 3rd ed., McGraw-Hill, at page 1221.

To prepare the finisher isomerization catalyst the silica-alumina combination of this invention is employed to support a minor amount of a nickel-containing hydrogenation agent. Examples of suitable agents include metallic nickel, nickel salts of oxy acids such as nickel molybdate, nickel phosphate, nickel borate, nickel chromate, nickel tungstate, and others.

The preferred method of including the hydrogenation agent in the composite catalyst is the conventional impregnation technique wherein the silica-alumina support is immersed in a soluble salt of the hydrogenation agent, and the wetted mass thereafter is subjected to selected chemical reduction techniques to convert the salt to the desired hydrogenation agent. Generally, the finished catalyst will contain about 0.5–8% of the nickelous hydrogenation agent, based on nickel.

The effectiveness of other nickel-containing catalyst compositions is shown by a catalyst consisting of 2.7% Ni and 4.4% Mo (present as oxide) on a support made in accordance with the invention by intimately mixing a 75/25 silica-alumina commercial cracking catalyst and a 95/5 alumina-silica composition having acidic characteristics, prepared as above. This was life-tested during the isomerization of light, straight-run, petroleum naphtha. Little or no degeneration in activity was evident at the termination of a 550-hour run.

The illustrative embodiment shows the advantage which obtains from the use of this invention in preparing a preconditioned isomerization catalyst in accordance with the process described and claimed in U.S. patent application Serial Number 619,376, entitled, "Process and Catalyst," filed by Norman L. Carr on October 31, 1956. It is to be understood, however, that the silica-alumina supports of this invention are also effective in enhancing the efficacy of the isomerization catalysts prepared in accordance with the teachings of Ciapetta, et al., cited supra.

Isomerization processes carried out in the presence of minor amounts, viz., 0.5–8% of a nickel-containing hydrogenation agent, based on nickel, supported on a silica-alumina combination prepared in accordance with this invention operate under the following conditions:

|  | Range | Range Preferred |
|---|---|---|
| Temperature, ° F | 600–750 | 650–700 |
| Pressure, p.s.i.g | 50–1,000 | 300–500 |
| Liquid Volume Hourly Space Velocity | 0.1–10 | 0.5–5.0 |
| $H_2$/hydrocarbon mol ratio | 0.5–6.0/1 | 2–4/1 |

Feed stocks which are processed include $C_5$–$C_8$ saturated hydrocarbons or mixtures thereof, such as light petroleum naphthas, natural gasolines, or other mixtures of petroleum hydrocarbons, boiling within the range of 90–250° F.

It is evident that modifications and variations within the scope of this invention will be apparent to those skilled in the art. Accordingly, the instant invention is limited only in the manner defined in the following claims.

We claim:

1. A catalyst for effecting the isomerization of saturated hydrocarbons comprising a major portion of a mixed silica-alumina support containing about 25%–60%, by weight, of alumina having incorporated therein a minor quantity of a hydrogenation agent selected from the group consisting of nickel, nickel molybdate, nickel phosphate, nickel borate, nickel chromate and nickel tungstate, said silica-alumina support consisting essentially of a mechanical admixture of (1) calcined, high-alumina constituent containing 1–10% by weight of silica and (2) calcined high-silica constituent containing 10–25% by weight of alumina, the respective portions of said constituents being sufficient to provide a composite silica-alumina admixture containing about 25%–60% by weight of alumina and the remainder being substantially silica.

2. A catalyst for effecting the isomerization of saturated hydrocarbons comprising a major portion of a mixed silica-alumina support containing about 25%–60% by weight of alumina having incorporated therein a minor quantity of a hydrogenation agent selected from the group consisting of nickel, nickel molybdate, nickel phosphate, nickel borate, nickel chromate and nickel tungstate, said silica-alumina support consisting essentially of a mechanical admixture of (1) 10–60% by weight of calcined high-alumina constituent containing 1–10% by weight of silica and (2) 90–40% by weight of calcined high-silica constituent containing 10–25% by weight of alumina, the respective portions of said constituents being sufficient to provide a composite silica-alumina admixture containing about 25%–60% by weight of alumina and the remainder being substantially silica.

3. A catalyst for effecting the isomerization of saturated hydrocarbons comprising a major portion of a mixed silica-alumina support containing about 25%–60% by weight of alumina having incorporated therein 0.5–

8% by weight, based on nickel and on the catalyst composition, of a hydrogenation agent selected from the group consisting of nickel, nickel molybdate, nickel phosphate, nickel borate, nickel chromate and nickel tungstate, said silica-alumina support consisting essentially of a mechanical admixture of (1) 10–60% by weight of calcined, high-alumina constituent containing 1–10% by weight of silica and (2) 90–40% by weight of calcined high-silica constituent containing 10–25% by weight of alumina, the respective portions of said constituents being sufficient to provide a composite silica-alumina admixture containing about 25%–60% by weight of alumina and the remainder being substantially silica.

4. A catalyst in accordance with claim 3 in which said high-alumina constituent is prepared by co-precipitation of the oxides or hydrous oxides of aluminum and silicon.

5. A catalyst for effecting the isomerization of saturated hydrocarbons comprising a major portion of a mixed silica-alumina support containing about 25%–60% by weight of alumina having incorporated therein 0.5–8% by weight, based on nickel and on the catalyst composition, of a hydrogenation agent selected from the group consisting of nickel, nickel molybdate, nickel phosphate, nickel borate, nickel chromate and nickel tungstate, said silica-alumina support consisting essentially of a mechanical admixture of (1) 10–60% by weight of a calcined, high-alumina constituent containing 5% by weight of silica and (2) 90–40% by weight of calcined high-silica constituent containing 25% by weight of alumina, the respective portions of said constituents being sufficient to provide a composite silica-alumina admixture containing about 25%–60% by weight of alumina and the remainder being substantially silica.

6. A catalyst for effecting the isomerization of saturated hydrocarbons comprising a major portion of a mixed silica-alumina support having incorporated therein 0.5–8% of a hydrogenation agent selected from the group consisting of nickel, nickel molybdate, nickel phosphate, nickel borate, nickel chromate and nickel tungstate, based on nickel and on the catalyst composition, said silica-alumina support consisting essentially of a mechanical admixture of (1) calcined high-alumina constituent containing 5% by weight of silica and (2) calcined, high-silica constituent containing 25% by weight of alumina, the respective portions of said constituents being sufficient to provide a composite silica-alumina admixture containing about 50% by weight of alumina, the remainder being substantially silica.

7. A catalyst in accordance with claim 6 in which said high-alumina constituent is prepared by co-precipitation of the oxides or hydrous oxides of aluminum and silicon.

8. An isomerization process which comprises reacting isomerizable $C_5$–$C_8$, saturated hydrocarbons at

| | Range |
|---|---|
| Temperature, °F. | 600–750 |
| Pressure, p.s.i.g. | 50–1000 |
| Liquid volume hourly space velocity | 0.1–10.0 |
| $H_2$/hydrocarbon mol ratio | 0.5–6.0/1 | in the presence of a catalyst comprising a major portion of a mixed silica-alumina support containing about 25%–60% by weight of alumina having incorporated therein a minor quantity of a hydrogenation agent selected from the group consisting of nickel, nickel molybdate, nickel phosphate, nickel borate, nickel chromate and nickel tungstate, said silica-alumina support consisting essentially of a mechanical admixture of (1) calcined, high-alumina constituent containing 1–10% by weight of silica and (2) calcined high-silica constituent containing 10–25% by weight of alumina, the respective portions of said constituents being sufficient to provide a composite silica-alumina admixture containing about 25%–60% by weight of alumina and the remainder being substantially silica.

9. An isomerization process which comprises reacting isomerizable $C_5$–$C_8$, saturated hydrocarbons at

| | Range |
|---|---|
| Temperature, °F. | 600–750 |
| Pressure, p.s.i.g. | 50–1000 |
| Liquid volume hourly space velocity | 0.1–10.0 |
| $H_2$/hydrocarbon mol ratio | 0.5–6.0/1 | in the presence of a catalyst comprising a major portion of a mixed silica-alumina support containing about 25%–60% by weight of alumina having incorporated therein a minor quantity of a hydrogenation agent selected from the group consisting of nickel molybdate, nickel phosphate, nickel borate, nickel chromate and nickel tungstate, said silica-alumina support consisting essentially of a mechanical admixture of (1) 10–60% by weight of calcined, high-alumina constituent containing 1–10% by weight of silica and (2) 90–40% by weight of calcined high-silica constituent containing 10–25% by weight of alumina, the respective portions of said constituents being sufficient to provide a composite silica-alumina admixture containing about 25%–60% by weight of alumina and the remainder being substantially silica.

10. An isomerization process which comprises reacting isomerizable $C_5$–$C_8$, saturated hydrocarbons at

| | Range |
|---|---|
| Temperature, °F. | 600–750 |
| Pressure, p.s.i.g. | 50–1000 |
| Liquid volume hourly space velocity | 0.1–10.0 |
| $H_2$/hydrocarbon mol ratio | 0.5–6.0/1 | in the presence of a catalyst comprising a major portion of a mixed silica-alumina support containing about 25%–60% by weight of alumina having incorporated therein 0.5–8% by weight, based on nickel and on the catalyst composition, of a hydrogenation agent selected from the group consisting of nickel, nickel molybdate, nickel phosphate, nickel borate, nickel chromate and nickel tungstate, said silica-alumina support consisting essentially of a mechanical admixture of (1) 10–60% by weight of calcined, high-alumina constituent containing 1–10% by weight of silica and (2) 90–40% by weight of calcined high-silica constituent containing 10–25% by weight of alumina, the respective portions of said constituents being sufficient to provide a composite silica-alumina admixture containing about 25%–60% by weight of alumina and the remainder being substantially silica.

11. An isomerization process which comprises reacting isomerizable $C_5$–$C_8$, saturated hydrocarbons at

| | Range |
|---|---|
| Temperature, °F. | 600–750 |
| Pressure, p.s.i.g. | 50–1000 |
| Liquid volume hourly space velocity | 0.1–10.0 |
| $H_2$/hydrocarbon mol ratio | 0.5–6.0/1 | in the presence of a catalyst comprising a major portion of a mixed silica-alumina support containing about 25%–60% by weight of alumina having incorporated therein 0.5–8% by weight, based on nickel and on the catalyst composition, of a hydrogenation agent selected from the group consisting of nickel, nickel molybdate, nickel phosphate, nickel borate, nickel chromate and nickel tungstate, said silica-alumina support consisting essentially of a mechanical admixture of (1) 10–60% by weight of calcined, high-alumina constituent containing 5% by weight of silica and (2) 90–40% by weight of calcined high-silica constituent containing 25% by weight of alumina, the respective portions of said constituents being sufficient to provide a composite silica-alumina admixture containing about 25–60% by weight of alumina and the remainder being substantially silica.

12. An isomerization process which comprises reacting isomerizable $C_5-C_8$, saturated hydrocarbons at

| | Range |
|---|---|
| Temperature, °F. | 600–750 |
| Pressure, p.s.i.g. | 50–1000 |
| Liquid volume hourly space velocity | 0.1–10.0 |
| $H_2$/hydrocarbon mol ratio | 0.5–6.0/1 | in the presence of a catalyst comprising a major portion of a mixed silica-alumina support having incorporated therein 0.5–8% of a hydrogenation agent selected from the group consisting of nickel, nickel molybdate, nickel phosphate, nickel borate, nickel chromate and nickel tungstate, based on nickel and on the catalyst composition, said silica-alumina support consisting essentially of a mechanical admixture of (1) calcined high-alumina constituent containing 5% by weight of silica and (2) calcined high-silica constituent containing 25% by weight of alumina, the respective portions of said constituents being sufficient to provide a composite silica-alumina admixture containing about 50% by weight of alumina, the remainder being substantially silica.

13. Catalyst in accordance with claim 1 in which the catalyst has the hydrogenation agent incorporated therein after admixture of the high-alumina and high-silica constituents.

14. Catalyst in accordance with claim 6 in which the catalyst has the hydrogenation agent incorporated therein after admixture of the high-alumina and high-silica constituents.

15. The process of preparing a catalyst useful to promote isomerization of $C_5-C_8$ saturated hydrocarbons comprising mixing sufficient calcined high-alumina catalyst containing 1–10% by weight of silica with high-silica catalyst containing 10–25% by weight of alumina to make a composite containing about 25–60% by weight of alumina and the remainder substantially silica, and impregnating the composite with a sufficient amount of a hydrogenating agent from the group of nickel, nickel molybdate, nickel phosphate, nickel borate, nickel chromate and nickel tungstate, to promote the isomerizing activity of the resulting catalyst.

16. Process in accordance with claim 15 in which the high-alumina catalyst contains 5% by weight of silica, the high-silica catalyst contains 25% by weight of alumina, and the composite contains about 50% of alumina and 50% of silica.

17. Process in accordance with claim 17 in which the composite is impregnated with nickel nitrate and then reduced with hydrogen at elevated temperature.

18. Process in accordance with claim 17 in which the composite is impregnated with nickel molybdate and reduced with hydrogen at elevated temperature.

References Cited in the file of this patent

UNITED STATES PATENTS

| 2,348,576 | Seguy | May 9, 1944 |
|---|---|---|
| 2,372,165 | Arveson | Mar. 20, 1945 |
| 2,550,531 | Ciapetta | Apr. 24, 1951 |
| 2,589,189 | Ciapetta et al. | Mar. 11, 1952 |
| 2,718,535 | McKinley et al. | Sept. 20, 1955 |

UNITED STATES PATENT OFFICE
CERTIFICATE OF CORRECTION

Patent No. 2,888,501                                        May 26, 1959

Hillis O. Folkins et al.

It is hereby certified that error appears in the printed specification of the above numbered patent requiring correction and that the said Letters Patent should read as corrected below.

Column 7, line 52, for "finisher" read -- finished --; column 10, line 13, for "of nickel" read -- of nickel, nickel --; column 12, line 17, for the claim reference numeral "17" read -- 16 --.

Signed and sealed this 20th day of October 1959.

(SEAL)
Attest:

KARL H. AXLINE
Attesting Officer

ROBERT C. WATSON
Commissioner of Patents